(12) United States Patent
Monereau et al.

(10) Patent No.: US 9,757,679 B2
(45) Date of Patent: Sep. 12, 2017

(54) ASSEMBLY OF STRUCTURED ADSORBENT MODULES

(71) Applicant: L'AIR LIQUIDE, SOCIETE ANONYME POUR L'ETUDE ET L'EXPLOITATION DES PROCEDES GEORGES CLAUDE, Paris (FR)

(72) Inventors: Christian Monereau, Montpellier (FR); Guillaume Rodrigues, Montigney-le-Bretonneux (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 14/408,859

(22) PCT Filed: Jun. 3, 2013

(86) PCT No.: PCT/FR2013/051248
§ 371 (c)(1),
(2) Date: Dec. 17, 2014

(87) PCT Pub. No.: WO2014/001670
PCT Pub. Date: Jan. 3, 2014

(65) Prior Publication Data
US 2015/0174520 A1    Jun. 25, 2015

(30) Foreign Application Priority Data

Jun. 29, 2012    (FR) .................................. 12 56238

(51) Int. Cl.
*B01D 53/02*    (2006.01)
*B01D 53/04*    (2006.01)
(Continued)

(52) U.S. Cl.
CPC ...... *B01D 53/0407* (2013.01); *B01J 20/2804* (2013.01); *B01J 20/28033* (2013.01);
(Continued)

(58) Field of Classification Search
CPC ........ B01D 2253/102; B01D 2253/104; B01D 2253/106; B01D 2253/108;
(Continued)

(56) References Cited

U.S. PATENT DOCUMENTS

| 6,783,738 B1 * | 8/2004 | Sasaki | .................... B01D 53/06 422/171 |
| 2008/0047436 A1 | 2/2008 | Baker | |
| 2012/0227583 A1 | 9/2012 | Monereau et al. | |

FOREIGN PATENT DOCUMENTS

| EP | 1 121 981 | 8/2001 |
| EP | 1 413 348 | 4/2004 |

(Continued)

OTHER PUBLICATIONS

Rezaei, F. et al., "Structured adsorbents in gas separation processes," Separation and purification Technology 70(2010) 243-256.
(Continued)

*Primary Examiner* — Christopher P Jones
(74) *Attorney, Agent, or Firm* — Elwood L. Haynes

(57) ABSTRACT

Adsorbent layer for adsorbing a fluid, comprising at least two adjacent modules of structured adsorbent, arranged in parallel in the direction of circulation of the fluid, characterized in that at least one of the two facing surfaces of the two adjacent modules is an adsorbent surface.

12 Claims, 6 Drawing Sheets

(51) Int. Cl.
*B01J 20/28* (2006.01)
*B01D 53/047* (2006.01)

(52) U.S. Cl.
CPC ... *B01J 20/28045* (2013.01); *B01J 20/28095* (2013.01); *B01D 53/047* (2013.01); *B01D 2253/102* (2013.01); *B01D 2253/104* (2013.01); *B01D 2253/106* (2013.01); *B01D 2253/108* (2013.01); *B01D 2253/25* (2013.01); *B01D 2253/342* (2013.01); *B01D 2257/108* (2013.01); *B01J 2220/66* (2013.01)

(58) Field of Classification Search
CPC .......... B01D 2253/25; B01D 2253/342; B01D 2257/108; B01D 53/0407; B01D 53/047; B01J 20/28033; B01J 20/2804; B01J 20/28045; B01J 20/28095; B01J 2220/66
See application file for complete search history.

(56) References Cited

FOREIGN PATENT DOCUMENTS

| | | |
|---|---|---|
| FR | 2 952 553 | 5/2011 |
| FR | 2 967 083 | 5/2012 |
| WO | WO 00 76628 | 12/2000 |
| WO | WO 02 066152 | 8/2002 |
| WO | WO 2005 032694 | 4/2005 |
| WO | WO 2005 094987 | 10/2005 |
| WO | WO 2006 074343 | 7/2006 |

OTHER PUBLICATIONS

French Search Report and Written Opinion for corresponding FR 1256238, Mar. 8, 2013.
International Search Report and Written Opinion for corresponding PCT/FR2013/051248, Jul. 24, 2013.

\* cited by examiner

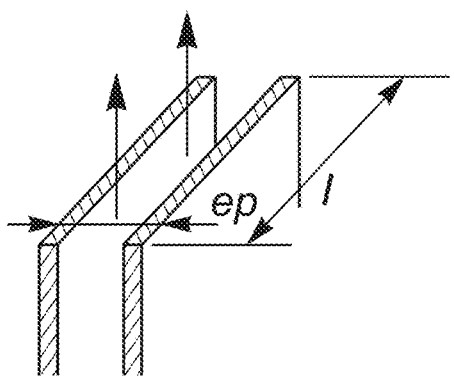
FIG. 1.1
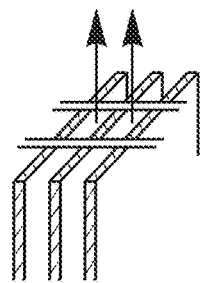
FIG. 1.2
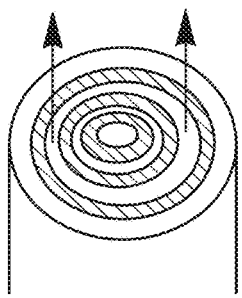
FIG. 1.3
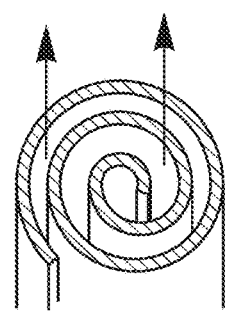
FIG. 1.4
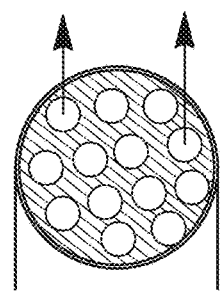
FIG. 1.5
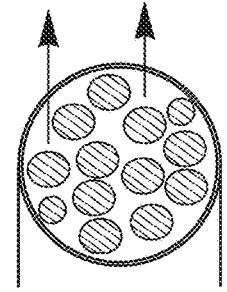
FIG. 1.6
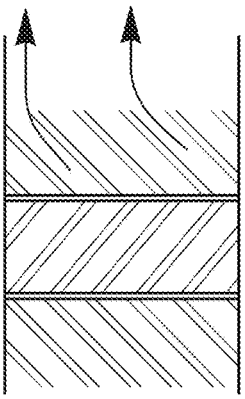
FIG. 1.7
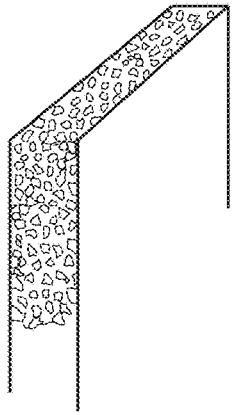
FIG. 1.8

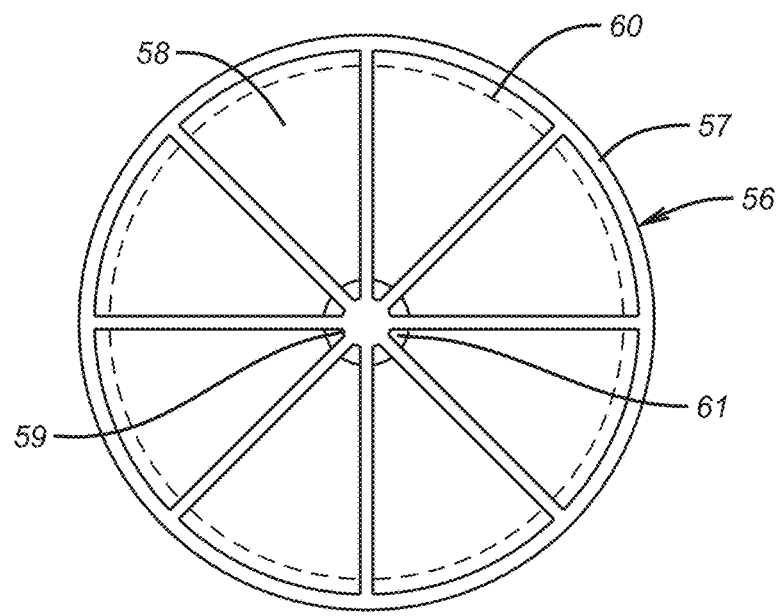
FIG. 3.1
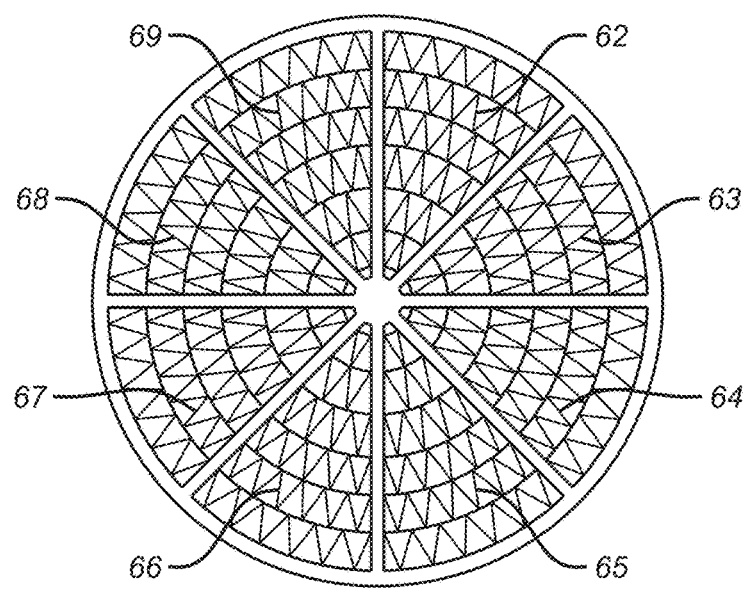
FIG. 3.2

ASSEMBLY OF STRUCTURED ADSORBENT MODULES

CROSS REFERENCE TO RELATED APPLICATIONS

This application is a 371 of International PCT Application No. PCT/FR2013/051248 filed Jun. 3, 2013 which claims priority to French Application No. 1256238 filed Jun. 29, 2012, the entire contents of which are incorporated herein by reference.

BACKGROUND

The present invention relates to an adsorbent layer made up of an assembly of modules of structured adsorbent, to an adsorber comprising at least one such layer and to a method employing such an adsorber for the purposes of ridding a fluid of at least one of it impurities.

In general, a method referred to as an adsorption method allows one or more gas molecules to be separated from a gaseous mixture containing them by exploiting the difference in affinity of a given adsorbent or, where appropriate, of several adsorbents, for these different gas molecules.

The affinity an adsorbent has for a gas molecule is dependent on the structure and composition of the adsorbent and on the properties of the molecule, notably its size, its electronic structure and its multipole moments.

An adsorbent may for example be a zeolite, an active charcoal, an activated alumina, a silica gel, a carbon-containing molecular sieve, a metallo-organic structure, an alkali-metal or alkaline-earth oxide or hydroxide, or a porous structure containing a substance capable of reacting reversibly with one or more gas molecules, such as amines, physical solvents, metallic sequestering agents, metal oxides or hydroxides for example.

Conventional adsorbent materials take the form of particles and are used in vessels (reactors) referred to as "adsorbers". The most common place adsorber geometries are cylindrical adsorbers with a vertical axis, with a horizontal axis, and radial adsorbers.

Said standard adsorbers take the form of beads, generally of diameters ranging from 0.5 to 5 mm, in the form of crushed adsorbents on a millimeter scale (generally measuring from 0.5 to 5 mm likewise), in the form of adsorbent pellets of diameters ranging from 0.5 to 6 mm and of length shorter than 1 cm. There are also a few extruded adsorbents of more complex shape such as trilobal adsorbents made up of three cylinders joined together, for example.

These adsorbents are tipped loose into the adsorbers and constitute a bed.

Several layers of adsorbents of different natures can thus be placed one on top of the other (or side by side in the case of a radial adsorber). In operation, the fluid passes through these successive beds by passing around said particles and the most adsorbable constituents are stopped preferentially within the adsorbent.

The use of the smallest particles generally makes it possible to improve the adsorption dynamic and thereby the efficiency of the method, but the counterpart to that is that they create large pressure drops in the fluid phase.

To counterbalance this effect, use is made of adsorbers that have a large passage cross section for the fluid, such as the horizontal-axis cylindrical adsorbers or the radial adsorbers mentioned hereinabove.

However, if seeking to improve the pressure drop and/or dynamics still further, this technology leads to adsorber geometries that are industrially unfeasible.

This is, for example, what happens where there is a wish to process large gas flow rates at low pressure, such as when capturing $CO_2$ from effluents at atmospheric pressure or when rapid cycles are to be performed, particularly PSA cycles.

For this reason, the structured adsorbent concept has recently been developed, as structured adsorbents, as opposed to particulate conventional adsorbents, have a more complex geometry, with dimensions substantially greater than one centimeter and offer the fluid a larger or easier passage. As opposed to particulate adsorbents (beads, pellets, crushed adsorbents) of dimensions smaller than 1 cm, that are tipped loose into an adsorber with the fluid circulating around the particles, structured adsorbents are solid materials of dimensions ranging from a few centimeters to a few meters and have passages that are free to gas, such as monoliths, foams or cloths. This type of adsorbent is notably described in the F. Rezaei, P. Webley document Separation and Purification Technology 70(2010) 243-256. Structured adsorbents (in comparison with granular adsorbents) have the special feature of allowing very good dynamics and very small pressure drops without having a known attrition limit. While these structures are currently far more expensive than granular adsorbents, their economic benefit as a full replacement for granular beds may prove decisive if it is accompanied by an appreciable improvement in pressure drop and/or a significant reduction in the cost of constructing the adsorber by reducing the volume of adsorbent or simplifying the construction.

The structured adsorbent used for preference is a contactor with parallel passages.

Contactors with parallel passages means a subgroup of structured adsorbents in which the fluid passes along channels, the walls of which contain the adsorbent, which channels are essentially free of obstacles and allow the fluid to circulate from an inlet of the contactor to an outlet thereof. These channels may be straight, connecting the inlet of the contactor to the outlet directly or may have changes in direction.

As it circulates, the fluid is in contact with at least one adsorbent present at said walls.

SUMMARY

An adsorbent layer for adsorbing a fluid, comprising at least two adjacent modules of structured adsorbent is provided. The fluid having a direction of circulation; the at least two adjacent modules having external surfaces facing one another, and are arranged in parallel in the direction of circulation of the fluid, wherein at least one of the two facing surfaces of the two adjacent modules is an adsorbent surface, said adsorbent layer having no means of sealing between the at least two adjacent modules.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1.1 illustrates one embodiment of the present invention;

FIG. 1.2 illustrates another embodiment of the present invention;

FIG. 1.3 illustrates another embodiment of the present invention;

FIG. 1.4 illustrates another embodiment of the present invention;

FIG. 1.5 illustrates another embodiment of the present invention;

FIG. 1.6 illustrates another embodiment of the present invention;

FIG. 1.7 illustrates another embodiment of the present invention;

FIG. 1.8 illustrates another embodiment of the present invention;

FIG. 3.1 illustrates another embodiment of the present invention;

FIG. 3.2 illustrates another embodiment of the present invention;

DESCRIPTION OF THE PREFERRED EMBODIMENTS

FIGS. 1.1 to 1.7 schematically and nonlimitingly depict various types of contactors. Indeed, the contactors may comprise channels of different shapes and different sizes. A distinction is therefore made between:

- rectangular channels of thickness ep that is small in relation to their width I, namely with I greater than 10 ep (FIG. 1.1);
- channels that are essentially square or rectangular but with ep of the same order of magnitude as the width I (FIG. 1.2);
- channels of intermediate shape, with the long dimension in a ratio 1.5 to 10 with respect to the short dimension (ellipse, rectangle, etc.);
- channels arranged in circular rings (FIG. 1.3);
- channels arranged in a helix (FIG. 1.4);
- circular channels (FIG. 1.5).

The fluid can also circulate in the empty space left by solid walls exhibiting the form of cylinders or fibers (FIG. 1.6). The solid walls may also have the "packing" configuration as used in distillation (FIG. 1.7). In the latter case, it is possible to use all the geometric options relating to said packings by altering the fold angles, the orientation of the passages with respect to the vertical (assuming the contactor to be vertical), the dimensions of the channels, etc.

There are numerous possible configurations because the geometry of the channels is varied (triangle, trapezium-shaped, elliptical etc.). In general, in all these types of contactor, which can be used in the context of the invention, the fluid, which is preferably a gaseous flow, circulates through channels which offer little (if anything) in the way of obstacles to the flow and the adsorbent is situated in—or constitutes—the wall of said channels.

Monoliths are generally manufactured by extrusion from a paste containing the adsorbent and a binder (1.8).

Figure 2:
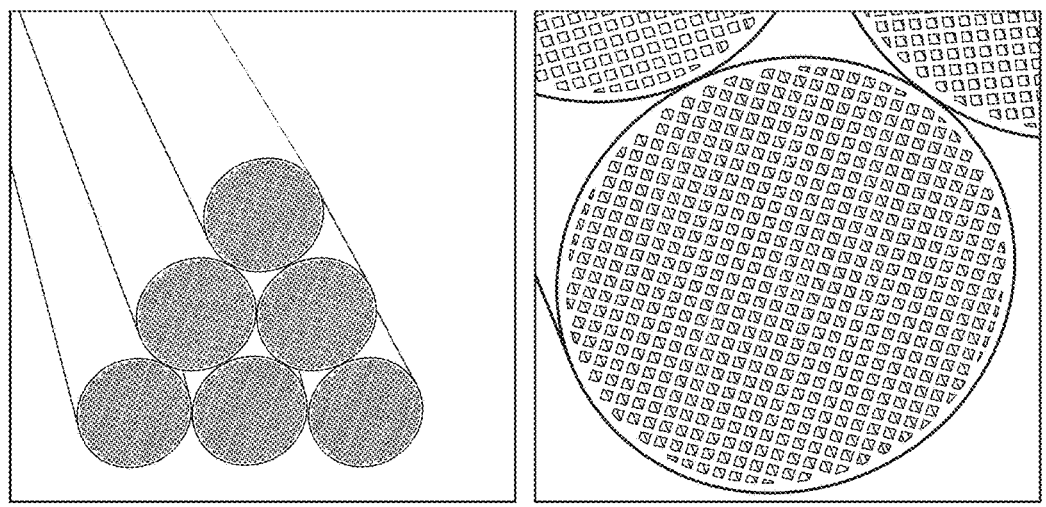
FIG. 2 illustrates another embodiment of the present invention.

By comparison with a standard adsorbent also obtained by extrusion (simple pellets or trilobal adsorbents) a monolith is a structure which within it comprises empty spaces for the passage of the gas (at least one, but generally more than one empty space) delimited by walls containing adsorbent. The monoliths mentioned here have external dimensions of several centimeters, or even of a few decimeters. Monoliths are depicted in the photographs (FIG. 2).

By way of example, documents EP 1 413 348, EP 1 121 981 and WO 2005/094987 describe contactors with parallel passages.

The term module is going to be used to denote the adsorbent element as can be manufactured as an elemental entity, in the form of a cylinder, a cube, a parallelepiped etc.

The dimensions of the modules will depend on the method used for manufacturing them. On an industrial scale there are adsorbent impellers used in air-conditioning ranging up to 5 to 6 meters in diameter, but the extruded monoliths generally have dimensions that do not exceed a few tens of decimeters.

In order to obtain the cross section needed for the target application, and with a view to not having to use too great a number of adsorbers in parallel, it is therefore generally advantageous to assemble several modules in parallel in a single layer.

For practical reasons such as the need to fit the adsorption modules through a manhole or through the inlet/outlet piping, it may also be necessary to use modules of moderate size, less than the maximum dimensions that could be manufactured, and to assemble them once again into a larger system which will, for example, have the cross section of the adsorber.

In any event, use will conventionally be made of a support structure comprising housings intended to accept the elemental modules.

The geometry of the support structure and of the housings intended to accommodate the said elements of structured adsorbent may be of varied shape.

The structure 56 in FIG. 3.1 comprises, for example, a circular ring 57 and spaces 58 creating housings that the elements of structured adsorbent will fill. This structure is a radiating structure intended to house elements of structured adsorbent made in the form of a wheel. The dimension of the elements must allow them to fit through and be fitted from the manhole. These elements rest on the lower part of the structure on external 60 and internal 61 supports. There are numerous types of support and more generally, ways of holding the elements in place that can be used.

FIG. 3.2 depicts the structure with the contactor elements (62, 63 . . . , 69) in place.

The metallic structure comprises 8 cells of a 45° angle in which are inserted elements cut from a wheel, the walls of which are covered with an adsorbent.

The various elements are cut from a wheel, the dimensions of which have been defined to fit the structure. The elements may have their lateral faces (parallel to the circulation of the gas) as cut, or covered with a material that protects them during handling.

In order to prevent any passage of gas between the external surface of the modules and the walls of their housing, sealing is achieved by any known means (gasket, slightly conically tapered elements held against the walls by pressure, etc.). The elements may themselves be housed in a wrapper, sealing between the element and the wall of said wrapper potentially being achieved definitively using an adhesive, a binder, etc., the wrapper then being fixed in a sealed manner to the structure for example by a seal at the periphery.

While it is effective, the support with its housings may be high in cost especially if the modules are small in size in relation to the adsorber. Walls and seals equate to a loss of useful volume and to additional weight. In addition, the existence of the housings because of their heat capacity and thermal conductivity, locally alters the thermal effects of the adsorbent and creates heterogeneities within the system.

Consequently, one problem that arises is that of providing an improved adsorbent layer comprising several modules of structured adsorbent.

One solution of the present invention is an adsorbent layer for adsorbing a fluid, comprising at least two adjacent modules of structured adsorbent, arranged in parallel in the direction of circulation of the fluid, characterized in that at least one of the two facing surfaces of the two adjacent modules is an adsorbent surface.

Thus, in the adsorbent layer according to the invention, the space between two adjacent modules works, which means to say holds back the impurities, in the same way as the actual modules themselves. There is therefore no longer any sealing to be provided between the modules. In addition, the entire cross section of the adsorbent layer becomes useful, making it possible to reduce the cross section of the adsorber and reduce the cost thereof.

For preference, the fluid is of gaseous flow.

Depending on circumstance, the adsorbent layer according to the invention may have one or more of the following features:
- the two facing surfaces of the two adjacent modules are adsorbent surfaces.
- the modules of structured adsorbent comprise channels of width d, and the mean spacing between two adjacent modules is less than or equal to d; and so the speed of the fluid circulating through the space between the modules is either less than or equal to the speed of the fluid circulating through the module;
- the space between two adjacent modules is kept constant by spacers.
- the adjacent modules nest together.
- the adjacent modules of structured adsorbent are contactors with parallel passages.
- the adjacent modules are identical or of different geometries.

Figure 4:
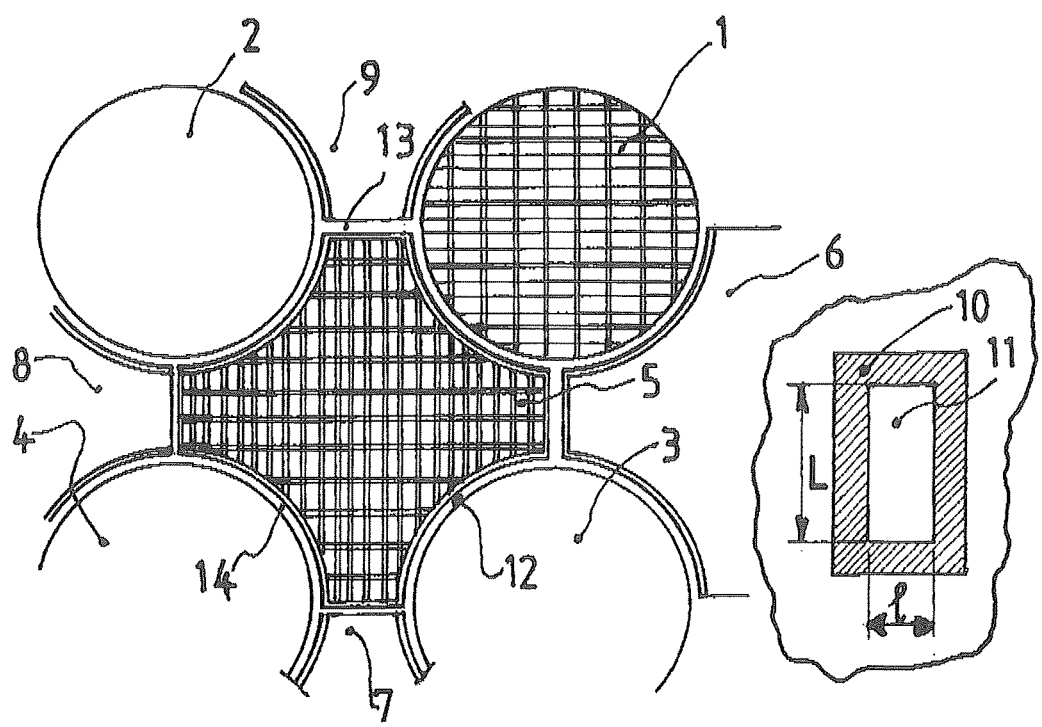
FIG. 4 illustrates another embodiment of the present invention.

FIG. 4 depicts in cross section a first arrangement of modules according to the invention.

The modules are of cylindrical type (1, 2, 3, 4 . . . ), or cross type (5, 6, 7, 8, 9 . . . ).

Only modules 1 and 5 are depicted in detail with adsorbent walls (shown darkened in the figure) and the channels (light) intended for the passage of the fluid. In this example, the channels 11 are length L and width I, 10 being the adsorbent wall.

The cylindrical modules are adjacent to 4 cross-shaped modules. The cross-shaped modules are adjacent to 4 cylindrical modules and to 4 cross-shaped modules. The distance (12, 13, 14 . . . ) between the various walls facing one another is such that d is less than or equal to the width I of the channels of the modules. The exterior walls of at least one type of module (in this instance the cross-shaped ones) are adsorbent so as to purify the fluid passing through the gaps between walls. For preference, the external wall of all the modules is adsorbent.

Figure 5:
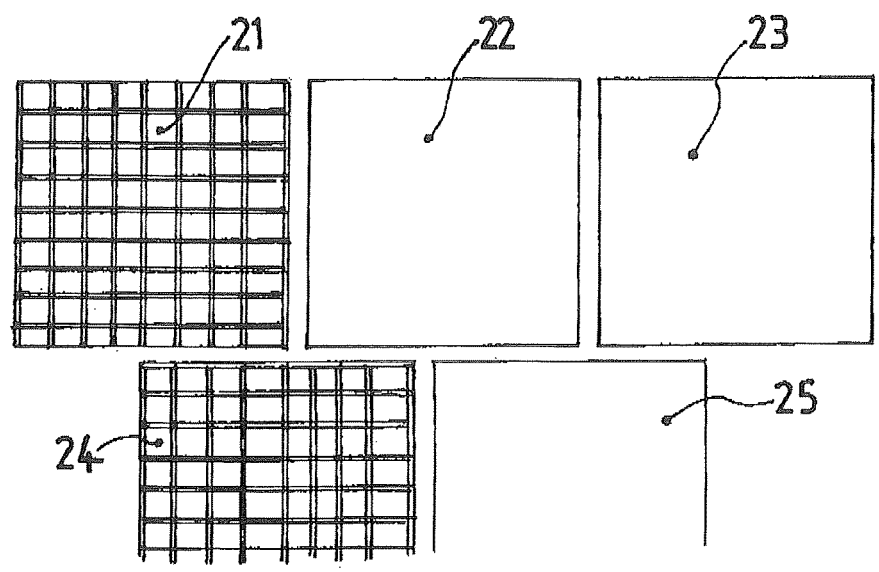
FIG. 5 illustrates another embodiment of the present invention.

FIG. 5 depicts a second arrangement whereby all the modules (21, 22, 23, 24, 25 . . . ) are identical (square section extrusions).

The walls of the modules generally have thicknesses ranging from 50 to 1000 microns and the channels have widths likewise ranging from 50 to 1000 microns. The spacing between the surfaces facing one another may range from a few microns to a few hundred microns depending on the internal dimensions of the modules.

These dimensions are average dimensions because all the elements have manufacturing tolerances ranging from a few microns to a few tens of microns.

Another subject of the present invention is an adsorber comprising at least one adsorbent layer according to the invention and a shell.

For preference, the wall of the adsorber acts as the shell.

Depending on circumstance, the adsorber may have one or more of the following features:
- the modules of structured adsorbent which are situated at the periphery of the adsorbent layer are cut to fit the shape of the shell;
- the empty space between the shell and the modules of structured adsorbent which are situated at the periphery of the adsorbent layer is less than or equal to d, preferably less than or equal to d/2, and the surface of the shell facing the modules situated at the periphery of the adsorbent layer and/or the surface of the modules facing the shell is an adsorbent surface; and so the speed of the fluid circulating between the shell and the adsorbent layer is either less than or equal to the speed of the fluid circulating through the modules, preferably less than or equal to the speed of the fluid circulating through the modules divided by two, and/or the space between the shell and the adsorbent layer will hold back the impurities in the fluid in the same way as the modules do. There is therefore no longer any sealing to be provided between the shell and the adsorbent layer;
- the space between the shell and the modules of structured adsorbent which are situated at the periphery of the adsorbent layer is kept constant by spacers;
- the empty space between the shell and the modules of structured adsorbent which are situated at the periphery of the adsorbent layer is plugged to prevent the passage of the fluid;
- said adsorber comprises a support for supporting the modules of structured adsorbent, said supporting being fixed to the shell and allowing the passage of the fluid;
- a first and a second adsorbent layer as claimed in the invention, the modules of the first adsorbent layer having a geometry and/or an adsorbent different than those of the modules of the second adsorbent layer.

The invention will now be described in greater detail with the aid of FIGS. 6 to 10.

Figure 6:
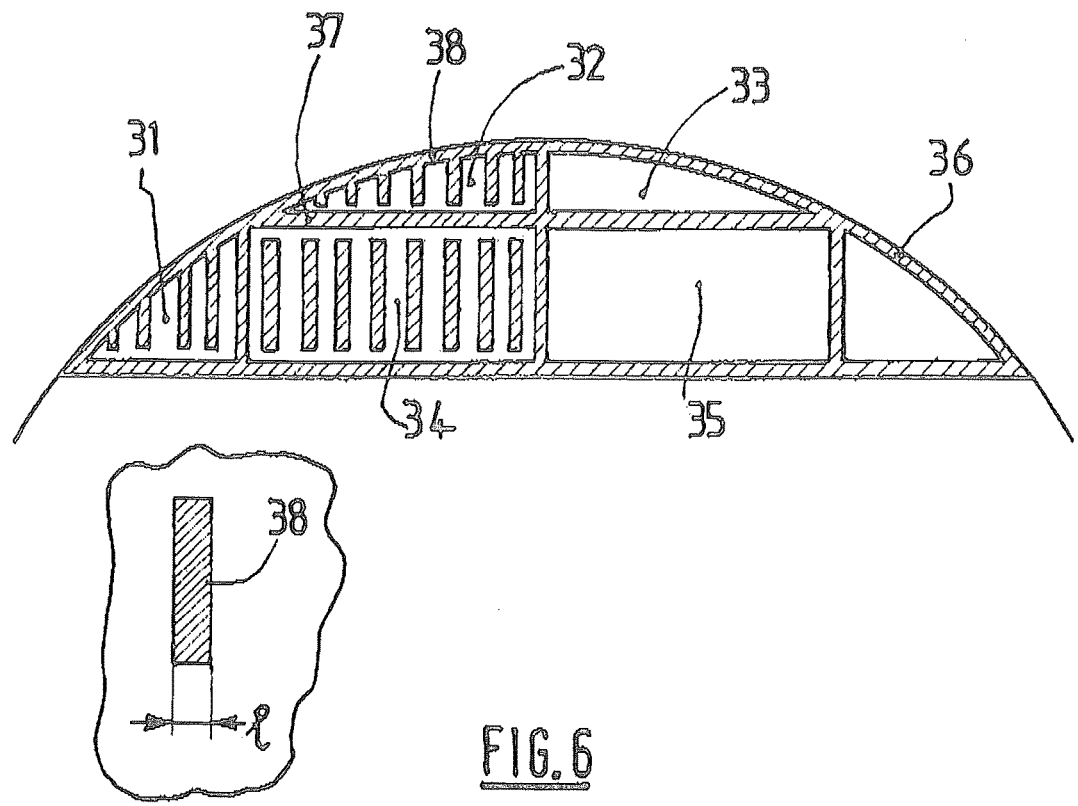
FIG. 6 illustrates another embodiment of the present invention.
Figure 7:
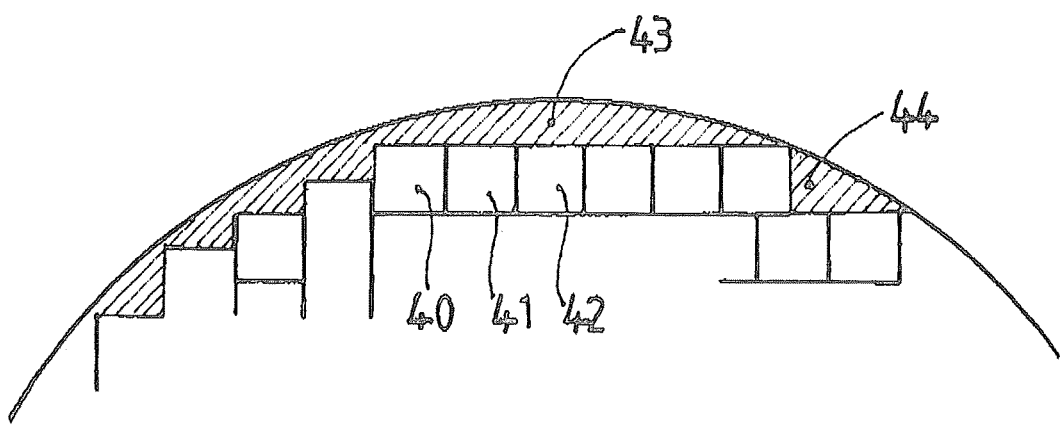
FIG. 7 illustrates another embodiment of the present invention.

FIGS. 6 and 7 show how the modules can be fitted into a shell.

More particularly, in FIG. 6, the modules at the periphery (31, 32, 33 . . . ) are cut to fit the shape of the shell 36, which here is cylindrical. The internal modules (34, 35 . . . ) are whole, as manufactured, of rectangular cross section. The fluid circulates through channels 38 of width I. The inter-module space e1 will be less than I but close to I and so here the space e2 between the shell and the modules at the periphery will generally be chosen to be less than or equal to I/2. Indeed it will be more advantageous for production for the surface of the shell not be covered with adsorbent. It is therefore appropriate to limit the flow rate of fluid passing to the wall so that the quantity of adsorbent it encounters is enough that no preferential passage for the constituents that are to be stopped is created.

A calculation of pressure drops at the periphery makes it possible to determine the maximum spacing e2max that needs to be adhered to in order for the local "quantity of adsorbent to flow rate" ratio to be high enough.

The shell (36) depicted may form part of the adsorber itself, the modules then being fitted directly into said adsorber or may alternatively form an integral part of the adsorbent layer. In the latter instance, it is the system comprising the contactors and the associated shell that is introduced into the adsorber. Sealing between the internal wall of the adsorber and the external shell of the adsorbent layer is for its part performed using one of the conventional and known means which will not be described in greater detail here (gasket, single brush, double brush, etc.).

FIG. 7 conversely illustrates the situation in which the adsorbent layer is made up of contactors as manufactured (40, 41, 42 . . . ). The empty spaces between the contactors of the periphery and the shell (43, 44 . . . ) are therefore plugged to prevent the gas from passing through this volume (using epoxy for example).

Figure 8:
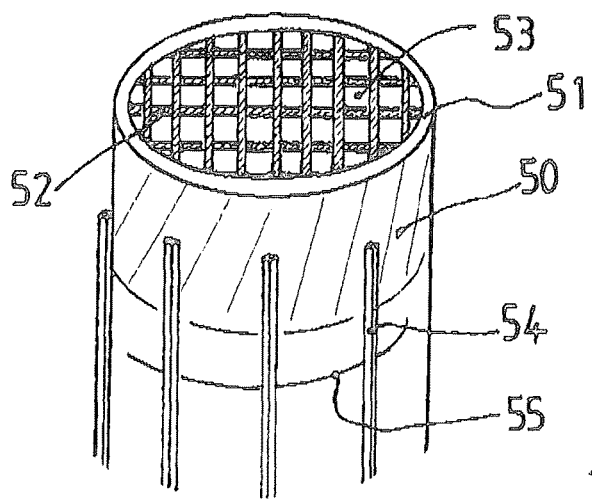
FIG. 8 illustrates another embodiment of the present invention.

FIG. 8 depicts a module of the cylindrical contactor type with parallel passages 50 manufactured by extrusion, with a typical dimension, namely diameter, of around 0.2 of a meter and of a height of around 0.5 of a meter. Assembled with cross-shaped contactors, likewise extruded (as depicted in FIG. 4), this may produce an adsorbent layer of a large cross section, for example in excess of 1 m², and a height of 0.5 of a meter.

The internal 52 and external 51 walls are identical in terms of the composition and contain the adsorbent. Inside the contactor, the fluid circulates through the channels 53. The spacing between cylindrical contactor and cross-shaped contactor is kept approximately constant by wires 54, themselves held tightly against the contactor by the thin wires 55. The thin wires themselves being attached:

either to themselves (end to end) if they pass fully around the contactor, or to a "coarse wire" 54 if they are spiral wound from the top downward.

The thickness of the wires 54 will for example be of the order of 100 to 250 microns whereas the retaining wires have a diameter of 10 to 20 microns.

Figure 9:
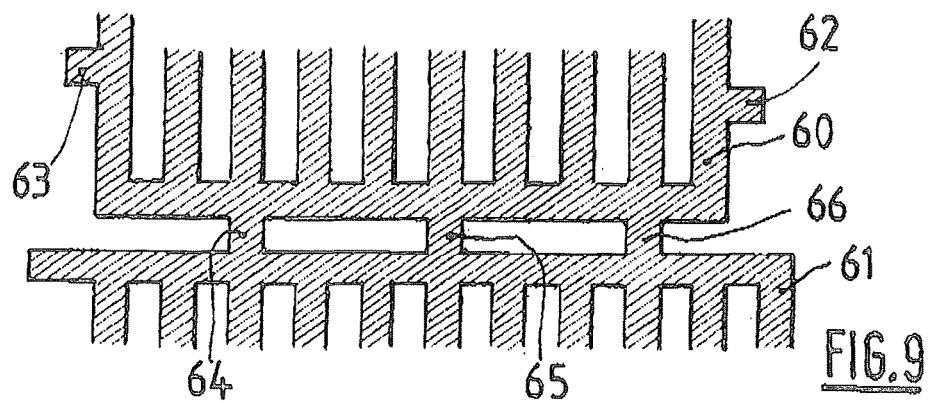
FIG. 9 illustrates another embodiment of the present invention.

FIG. 9 depicts a partial cross section showing a contactor 60 and a contactor 61 of extruded type. The spacing between the contactors is kept constant and, in this case, equal to the width of the channels in the extrusions, by "strips" (63, 64, 65, 66 . . . ) which form an integral part of the extrusion 60.

Figure 10:
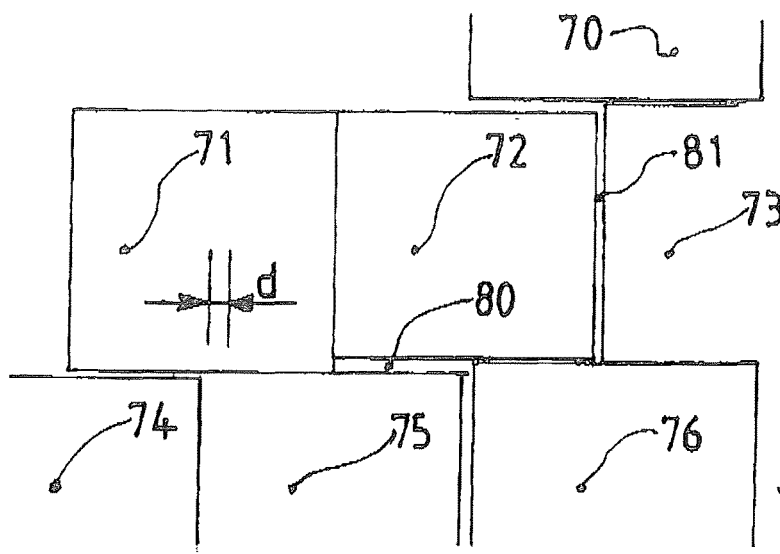
FIG. 10 illustrates another embodiment of the present invention.

It is also possible to provide nothing at all in order deliberately to maintain an uneven spacing between the adsorbent surfaces of the various contactors (70, 71, 72, . . . 76, . . . ) as shown in FIG. 10. Spaces (80, 81, . . . ) will then occur locally according to the manufacturing tolerances. These tolerances will then be set so that the maximum spacing emax (in this instance the space 80) is smaller than the width d of the channels of the contactors.

Where the outer shell forms part of the adsorbent layer in order to allow it to be handled and simply slipped into the adsorber, said shell may be "clamped" against the contactors by any means (brace, band, etc.) in order to limit the separations between the shell and the contactors at the periphery and, more generally, to clamp the contactors (with the spacers if any) together.

The contactors depicted hitherto have been of simple shape (square, cylindrical, rectangular, cross-shaped). If the contactors are extruded, then varied shapes may be conceivable such that they nest together like the pieces of a jigsaw puzzle or the works of Escher.

Whatever the shape of the contactors, the object of this invention is for them to fit together in order deliberately or as a result of manufacturing defects or manufacturing tolerances, to leave between them spaces that are small enough that the speed at which the fluid circulates is less than, or at the most equal to, the speed of this same fluid through the passages reserved for it within the contactors.

Having an exterior wall that is adsorbent in a similar way to the internal walls of the contactor, means that the fluid flow encounters at least in proportion a large enough quantity of adsorbent to perform the separation at which the method is aimed.

The height H of the adsorbent layers that can be achieved will be limited by that of the contactors, namely generally between 200 and 500 mm, and more exceptionally 1 meter.

It may prove necessary to install in an adsorber several successive layers which are either identical or of different natures.

What is meant by different natures is, for example, different channel dimensions, adsorbent particle or crystal sizes, wall thickness, etc., but also different natures of adsorbent.

An adsorber of an H2 PSA may for example comprise, in the direction of circulation of the processed gas, a one-off 0.2 m adsorbent layer of activated alumina or of silica gel, 3-off layers of active charcoal 0.5 m high, a one-off 0.5 m layer of active charcoal with improved dynamics, a one-off 0.5 m adsorbent layer based on zeolite X, and a one-off likewise 0.5 m layer of zeolite 5A.

For preference, each layer will be formed of contactors with parallel passages obtained by extrusion. The diameter of the adsorbent layers, depending on the flow rate of the gas to be treated, may range from several tens of centimeters to several meters.

The invention may thus be applied to the various PSA methods such as PSA $O_2$, $N_2$, $CO_2$, $CH_4$, $H_2$. PSA here means any type of method using variations in pressure (PSA proper, VSA, PTSA, MPSA, RPSA—PSA, rapid cycle PSA, etc.)

More generally, it may be applied to any type of adsorption process: guard bed, TSA etc.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An adsorbent layer for adsorbing a fluid, comprising at least two adjacent modules of structured adsorbent, empty spaces between the at least two adjacent modules, the fluid having a direction of circulation; the at least two adjacent modules having external surfaces facing one another, and are arranged in parallel in the direction of circulation of the fluid, wherein at least one of the two facing surfaces of the two adjacent modules is an adsorbent surface, said adsorbent layer having no means of sealing between the at least two adjacent modules, wherein:

the modules of structured adsorbent comprise channels of width d, and a mean spacing between two adjacent modules is less than or equal to d, wherein the fluid may circulate in the empty spaces between the at least two adjacent modules.

2. The adsorbent layer of claim 1, wherein the two facing surfaces of the two adjacent modules are adsorbent surfaces.

3. The adsorbent layer of claim 1, wherein the space between two adjacent modules is kept constant by spacers.

4. The adsorbent layer of claim 1, wherein the adjacent modules nest together.

5. The adsorbent layer of claim 1, wherein the adjacent modules of structured adsorbent are contactors with parallel passages.

6. The adsorbent layer of claim 1, wherein the adjacent modules are identical or of different geometries.

7. An adsorber comprising:
at least one adsorbent layer of claim 1, and
a shell.

8. The adsorber of claim 7, wherein the modules of structured adsorbent which are situated at the periphery of the adsorbent layer are cut to fit the shape of the shell.

9. The adsorber of claim 7, wherein:
an empty space between the shell and the modules of structured adsorbent which are situated at the periphery of the adsorbent layer is less than or equal to d, and
the surface of the shell facing the modules situated at the periphery of the adsorbent layer and/or the surface of the modules facing the shell is an adsorbent surface.

10. The adsorber of claim 9, wherein the empty space between the shell and the modules of structured adsorbent which are situated at the periphery of the adsorbent layer is kept constant by spacers.

11. The adsorber of claim 7, wherein the empty space between the shell and the modules of structured adsorbents which are situated at the periphery of the adsorbent layer is plugged to prevent the passage of the fluid.

12. The adsorber of claim 7, wherein said adsorber comprises a support for supporting the modules of structured adsorbent, said support being fixed to the shell and allowing the passage of the fluid.

* * * * *